United States Patent Office 2,752,021
Patented June 26, 1956

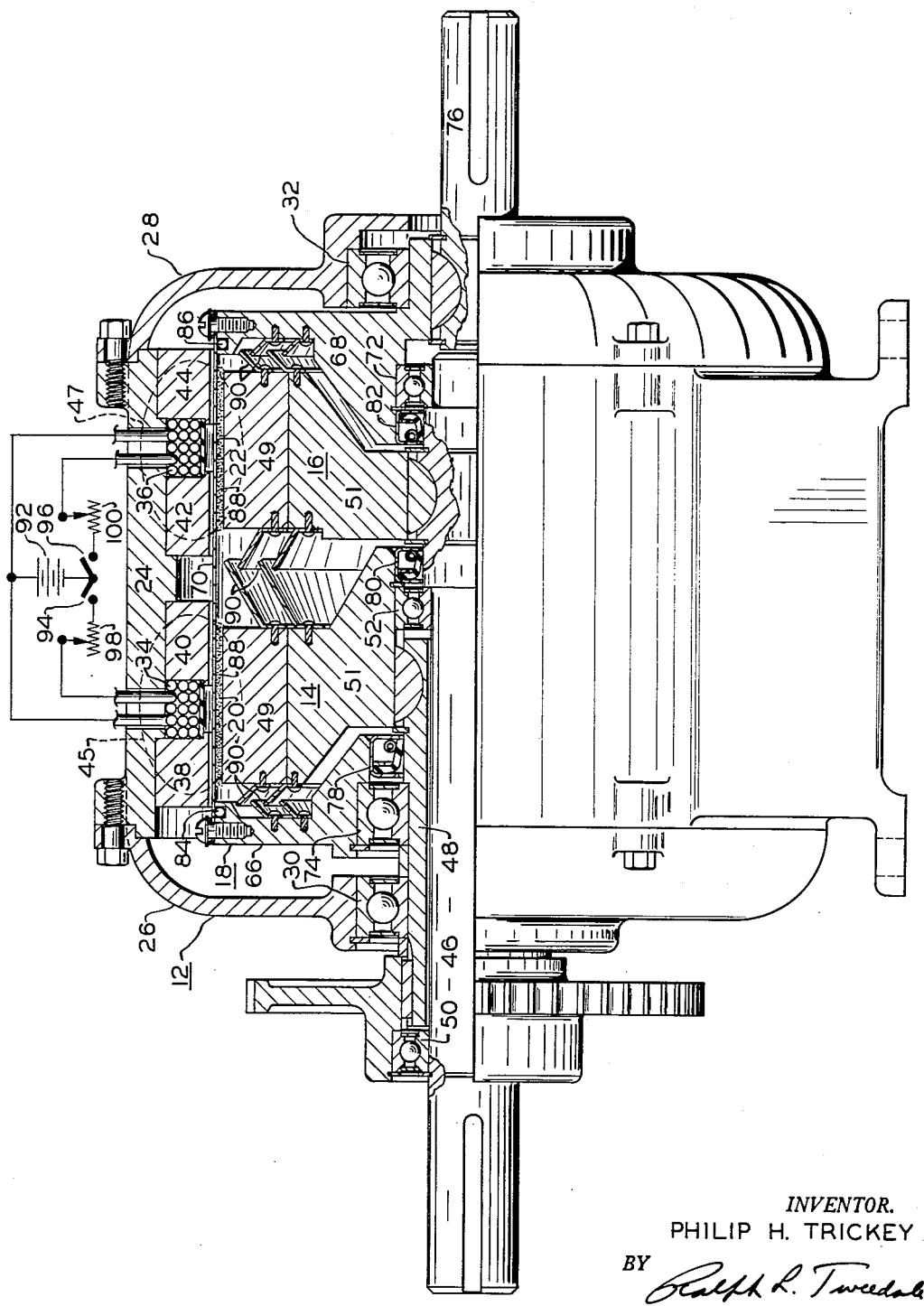

2,752,021
POWER TRANSMISSION

Philip H. Trickey, Webster Groves, Mo., assignor to Vickers Incorporated, Detroit, Mich., a corporation of Michigan Application September 7, 1950, Serial No. 183,496

3 Claims. (Cl. 192—21.5)

This invention relates to power transmission, and more particularly to magnetic torque transmitting devices such as brakes and clutches.

In the field of torque transmission and control of rotating machinery, it is often desirable to transmit torque selectively between one and a plurality of other coupling members either for braking or driving purposes without the necessity of physically shifting rotating units such as gears and clutch plates. Such systems using the magnetic coupling devices heretofore available would be cumbersome multi-unit structural networks. This invention contemplates a compact unitary magnetic drive in which torque may be transmitted between one coupling member and any of a plurality of other coupling members.

It is therefore an object of this invention to provide a new and useful magnetic coupling device.

It is another object of this invention to provide a new and useful magnetic drive for transmitting torque between one coupling member and any of a plurality of other coupling members.

Further objects and advantages of the present invention will be apparent from the following description, reference being had to the accompanying drawing wherein a preferred form of the present invention is clearly shown.

In the drawing the single figure is a view, partly in section, of a selective magnetic drive or clutch illustrating one embodiment of the invention.

In accordance with one embodiment of the invention, as illustrated in the drawing, a magnetic drive is provided with a unitary housing frame 12 in which either of a pair of relatively rotatable inner coupling members 14 and 16 may be coupled to an outer rotary coupling member 18 by selectively exciting magnetic particle filled radial gaps 20 and 22 between the outer member 18 and the inner members 14 and 16. The housing frame 12 includes a cylindrical member 24 and end bells 26 and 28 provided with bearings 30 and 32 for carrying the respective input and output shafts connected to the rotatable coupling members. At either of the gaps the cylindrical member 24, the outer coupling member 18, and the inner coupling member at the gap are concentric.

The gaps 20 and 22 are magnetically excited by magnetizing sources such as electrical coils and the necessary magnetic structure to provide reasonably low reluctance paths to the gaps. Exciting coils 34 and 36 may be carried by one of the concentric members associated with the respective gaps, for example, the exciting coils for both gaps may be secured within the cylindrical member 24 while ring-like pole pieces 38, 40, 42, and 44 are disposed on opposite sides of the coils as shown to concentrate the magnetic forces at the gaps. As shown in the drawing, the ring pole pieces 38, 40, 42 and 44 are not of one piece with the frame member 24 and are separable therefrom in order to permit easy coil assembly and coil removal, and to reduce manufacturing difficulties. In order to provide low reluctance paths for the magnetic circuits indicated by the dotted lines 45 and 47, the cylindrical member 24 and the inner coupling members 14 and 16 should be made of magnetic material along the indicated paths. To reduce magnetic leakage and decrease reluctance drag, the inner members 14 and 16 may each be made of two concentric parts, a magnetic rim portion 49 and a non-magnetic central portion 51. Preferably the end bells 26 and 28 should be non-magnetic and they may be held in place by bolts or any other suitable means.

The inner coupling member 16 is fixedly mounted on a shaft 46 which passes through a sleeve shaft 48 on which the inner coupling member 14 is fixed. Separation between the concentric shafts 48 and 46 is maintained by internal bearings 50 and 52. In addition to the bearings 50 and 52, the sleeve shaft 48 is also carried by a bearing 30.

Substantially solid, disc-like hubs 66 and 68, preferably of non-magnetic material, and located at opposite ends of the outer coupling member 18, support a thin-walled cylinder 70, preferably of ferromagnetic material, and disposed in the gap between the magnetic poles 38, 40, 42, and 44, and the peripheral surfaces of the inner coupling members 14 and 16. The wall of the cylinder 70 is preferably thin so that it will rapidly saturate at the gaps in order to reduce to a minimum magnetic shunting effects due to the cylinder wall. Bearings for the outer coupling member 18 are provided at 32, 72, and 74, and a shaft 76 for this coupling member is fixed to the hub 68. Suitable seals, depending upon the type of magnetic particle mixture used, may be employed at strategic positions, for example at 78, 80, 82, 84, and 86. The cylindrical and hub sections of the outer coupling member in assembled relation provide a substantially closed hollow cylinder surrounding the inner coupling members.

It will be seen from the drawing that the cylindrical portion 70 of the outer coupling member 18 rides in a radial gap defined by the peripheral surfaces of the inner coupling members 14 and 16, and the inner peripheral surfaces of the magnetic poles 38, 40, 42, and 44. Magnetic particles 88 disposed in the gaps 20 and 22 serve to transmit torque between the inner and outer coupling members when magnetically excited. The magnetic particles 88, which may be small ferromagnetic particles, may be suitably mixed with dry or fluid lubricants as desired. Graphite is a suitable dry lubricant while both hydrocarbon and silicone fluids have been successfully used as fluid lubricants. Annular centrifugal slingers 90, shaped like pie plate rims, are secured to the rotating coupling members to act as retainers and traps for any magnetic particles that tend to drop from the gaps, and serve to sling the particles toward the gaps 20 and 22 when the coupling members rotate. The closed structure of the outer coupling member serves to prevent the escape of the magnetic particles 88. Exciting current for the coils 34 and 36 may be selectively furnished to either from a current source, for example a battery 92, through selector switches 94 and 96 while the current amplitude to either may be controlled by rheostats 98 and 100.

Coupling members 14 and 16 may be used as input or as output members, with the coupling member 18 acting as the input or the output as the case may be. For example, the apparatus may be used as a reversible drive or clutch by employing the coupling member 18 as the output member with its shaft 76 connected to a load, and the coupling members 14 and 16 as the input members which would be driven in opposite directions by motive power connected to their respective shafts 46 and 48.

In this arrangement, the rotational direction of the output shaft 76 will depend on which of the gaps 20 or 22 is magnetically excited, this in turn being dependent on which of the coils 34 and 36 is energized. To drive the output shaft 76 in either direction the outer coupling member 18 is coupled to the inner coupling member rotating in the desired direction. Coupling between the outer coupling member and the desired inner coupling member is effected by energizing the coil opposite that inner coupling member, thus magnetically exciting the gap associated with that coupling member and the magnetic particles disposed therein. For example, exciting the gap 20 by energizing the coil 34 will couple the outer member 18 to the inner member 14 and drive the output shaft 76 in the same direction as the input shaft 48. Likewise, if the gap 22 is excited by energizing coil 36 the shaft 76 will rotate in the opposite direction, i. e., the direction of shaft 46.

By connecting the power input to the shaft 76 the shafts 46 and 48 will provide a dual output which may be selectively and differentially controlled by selective and differential control of the magnetic excitation across the gaps 20 and 22. The latter may be effected by the proper use of the selector switches 94 and 96 and rheostats 98 and 100.

While the form of embodiment of the invention as herein disclosed constitutes a preferred form, it is to be understood that other forms might be adopted, all coming within the scope of the claims which follow.

What is claimed is as follows:

1. A magnetic torque transmitting device comprising a pair of separate cylindrical inner coupling members having peripheral magnetic surfaces, a separate outer hollow cylindrical coupling member substantially enclosing the inner members and having a magnetic cylindrical wall with an inner surface cooperating with said peripheral surfaces to define a radial gap between the outer member and each inner member, and means for selectively coupling the outer member with the inner members, said means including magnetic particles disposed in said gaps, and magnetizing means for exciting said gaps, said last means including a stationary magnetizing yoke around said outer member and having separate removable ring magnetic poles with energizing coil means disposed therebetween.

2. A magnetic torque transmitting device comprising a pair of separate cylindrical inner coupling members having peripheral magnetic surfaces, a separate outer hollow cylindrical coupling member substantially enclosing the inner members and having an inner cylindrical surface cooperating with said peripheral surfaces to define a radial gap between the outer member and each inner member, and means for selectively coupling the outer member with the inner members, said means including magnetic particles disposed in said gaps and magnetizing means for exciting said gaps, said last means including a stationary yoke around said outer member, said yoke having removable ring magnetic pole means and electrical coil means for energizing said pole means.

3. A magnetic torque transmitting device comprising a pair of separate cylindrical inner coupling members having peripheral magnetic surfaces, a separate outer hollow cylindrical coupling member substantially enclosing the inner members and having a relatively easily saturable cylindrical wall with an inner surface cooperating with said peripheral surfaces to define a radial gap between the outer member and each inner member, and means for selectively coupling the outer member with the inner members, said means including magnetic particles disposed in said gaps, and magnetizing means for exciting said gaps, said last means including a stationary magnetizing yoke around said outer member and having removable ring magnetic pole means and electrical coil means for energizing said pole means.

References Cited in the file of this patent

UNITED STATES PATENTS

| | | |
|---|---|---|
| 1,265,078 | Grote | May 7, 1918 |
| 2,525,571 | Winther | Oct. 10, 1950 |
| 2,549,738 | Winther | Apr. 17, 1951 |
| 2,549,896 | Dunham | Apr. 24, 1951 |
| 2,575,360 | Rabinow | Nov. 20, 1951 |
| 2,616,539 | Wattenberger | Nov. 4, 1952 |
| 2,629,552 | Dickey | Feb. 24, 1953 |
| 2,684,138 | Buckman | July 20, 1954 |
| 2,695,675 | Frye | Nov. 30, 1954 |

FOREIGN PATENTS

| | | |
|---|---|---|
| 485,591 | Belgium | Nov. 13, 1948 |

OTHER REFERENCES

Novel Transmission, Machine Design, April 1950, page 133.

Magnetic Fluid Clutch in Servo Applications, Electronics, November 1949, page 100.